United States Patent Office 3,114,743
Patented Dec. 17, 1963

3,114,743
METHOD OF PREPARING SYNTHETIC RUBBER
Samuel E. Horne, Jr., Akron, Ohio, assignor to Goodrich-Gulf Chemicals, Inc., Pittsburgh, Pa., a corporation of Delaware
No Drawing. Filed Dec. 2, 1954, Ser. No. 472,786
8 Claims. (Cl. 260—94.3)

This invention relates to a new and vastly improved type of synthetic (man-made) rubber having a structure and properties remarkably different from heretofore-known synthetic rubbers. In more particular, this invention pertains to synthetic polyisoprene having a regular isoprene 1,4, all-cis, head-to-tail structure, and to the preparation thereof by a polymerization technique involving the use of certain metal catalysts of a totally different nature than catalysts previously used in diene polymerizations.

In the polymerization of isoprene, the possible modes of union of the monomer units making up the polymer molecules are quite numerous. To illustrate, 1,4 addition polymerizaiton may take place to give 1,4-units (I) and addition may occur 1,2 at the substituted double bond to produce 1,2-units (II) and at the unsubstituted double bond to give 3,4-units (III). Moreover the 1,4-units may exist in both cis (IV) and trans (V) configurations about the double bond and they may be united to one another in both "head-to-head and tail-to-tail" (VI) and "head-to-tail" (VII) fashions.

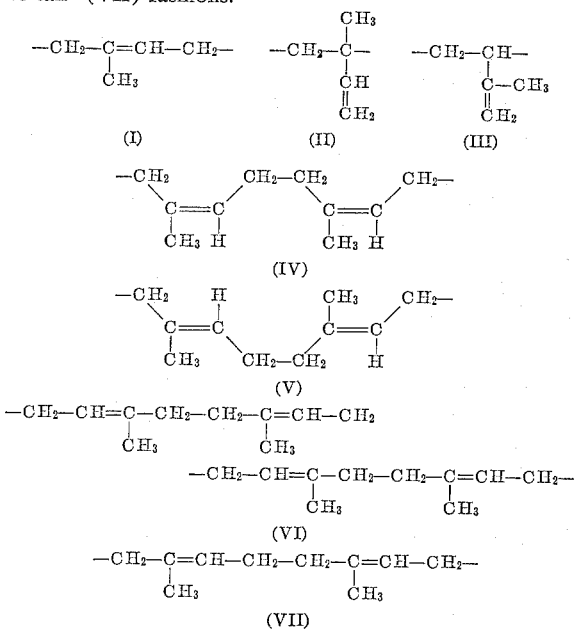

It is well known that the hydrocarbon present in natural rubber has a regular isoprene 1,4, all-cis, head-to-tail structure derived by biological in vivo processes not involving monomeric isoprene, but that in the synthetic polymers heretofore prepared from monomeric dienes such regularity is completely missing, with all of the various structural units present to a greater or lesser degree dependent on the method of polymerization. The synthetic preparation by in vitro polymerization of a 1,4, all-cis polymer has long been considered highly desirable, because of the probabilities that such a polymer would possess properties analogous to those imparted to natural rubber by the presence of the natural rubber hydrocarbon, and has been a prime objective of many synthetic rubber research groups for many years. Nevertheless, the state of the art in this regard is summarized by Whitby in "Synthetic Rubber" published 1954 by John Wiley & Sons at page 16 as follows: "At present no techniques are known capable of insuring the presence of only a single kind of structural unit in diene polymers; all known techniques result in polymers in which cis-1,4, trans 1,4 and 1,2 diene units occur."

Accordingly one of the principal objects of this invention is to prepare an isoprene polymer having a 1,4, all-cis, head-to-tail structure analogous to that of the natural rubber hydrocarbon.

Another principal object is to provide a synthetic isoprene polymer having properties superior to those of known synthetic rubbers in both the unvulcanized and vulcanized states, particularly in regard to processability and tackiness of the unvulcanized material, stress-strain properties in "pure gum" vulcanizates, hysteresis properties of vulcanizates, and ability of vulcanizates to retain the desired physical properties over a wide range of temperatures.

Still another object is to provide a synthetic rubber having a uniformity of quality not present in tree-produced rubber, and the ability to be controlled more readily, particularly with regard to compounding and vulcanizing recipes and techniques.

Yet another object is to provide a new process for polymerizing isoprene and, in particular, to provide novel, highly active catalysts for the polymerization of isoprene.

In summary, the primary objective of this invention is to provide an efficient, practical and economical product and process enabling the manufacture of a vastly-improved type of polyisoprene analogous in structure and properties to the natural rubber hydrocarbon, but superior to natural rubber by reason of its in vitro origin, and making it possible economically to produce synthetic rubber equivalent and superior to natural rubber in all or substantially all technologically important respects, thereby freeing the world from dependence on tree-produced rubber.

These and still further objects, including various secondary objects, will become apparent from the description of the invention to follow.

In accordance with this invention isoprene is polymerized to form a rubber which is a high molecular weight 1,4, all-cis polyisoprene, by contact of monomeric isoprene with a catalyst (termed herein a heavy metal catalyst) prepared by the reaction between substantially equimolar proportions of (1) a compound of a heavy metal occurring in the 4th to 6th positions of the long periods of the periodic table and (2) an organo-aluminum compound to be hereinafter defined, the reaction taking place in the absence of free oxygen and water. The exact nature of the catalysts so produced is not known with certainty, but they apparently contain heavy metal compounds, in which the heavy metal atom is in a reduced state and exhibits a valence lower than its maximum valance.

The heavy metal compound used in preparing the heavy metal catalyst may be any compound of a metal occupying the 4th to 6th positions of the long periods of the periodic table in which the elements are arranged in short and long periods and the alkali metals occupy the first position (see Periodic Chart of the Elements on pages 342–343 of 23rd edition of Handbook of Chemistry and Physics, published 1951 by Chemical Rubber Publishing Co.). Such metals are those of periodic groups IVB, VB and VIB, including titanium, zirconium, hafnium, vanadium, niobium (columbium), tantalum, chromium, molybdenum and tungsten as well as metals in corresponding positions in the last long period in the so-called "actinium series" such as thorium and uranium. The preferred heavy metal compounds are the salts of the formula $M(A)_n$ wherein M is the heavy metal atom, A is a monovalent anion and $n$ is the maximum valence of M. Especially preferred are the halides (chlorides, bromides, iodides and fluorides) and acetylacetonates of titanium, zirconium, thorium and uranium with titanium chlorides being most preferred. Other heavy metal compounds include other inorganic salts such as oxyhalides, sulfates, nitrates, sulfides and the like and other organic salts such as acetates and oxalates of the heavy metals of the above group.

As hereinabove stated, the heavy metal compounds disclosed in the next preceding paragraph are converted into the heavy metal catalysts by reaction with certain definite proportions of certain organo-aluminum compounds, the reaction being carried out in the absence of free oxygen and water, preferably in the absence of any materials other than the reactants involved and inert hydrocarbon solvents or diluents, and particularly in the absence of active hydrogen compounds such as alcohols, acids, amines, etc., as well as free oxygen and water.

The organo-aluminum compounds to be used possess the structure

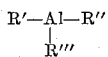

wherein R' is a hydrocarbon radical, R" is either another R' radical or an —OR' radical or a hydrogen, or halogen atom and R''' is another R' radical or hydrogen. The most preferred organo-aluminum compounds are aluminum trialkyls, $Al(R)_3$, wherein each R is an alkyl such as ethyl, propyl, butyl, isobutyl, amyl, hexyl, octyl, dodecyl, etc., or a substituted alkyl such as phenylethyl, 2-phenyl propyl, etc. Other organo-aluminum compounds are the alkyl aluminum hydrides $(R)_mAl(H)_n$ wherein R is the same as above and $m$ and $n$ are integers totaling 3; the dialkyl aluminum halides $R_2AlX$ wherein X is a halogen atom including chlorine, bromine, iodine and fluorine, and R is the same as above; the dialkyl aluminum alkoxides $R_2AlOR$ wherein R is the same as above; and the organo-aluminum compounds of the above-type formulae wherein R represents, in place of alkyl, an aryl group, such phenyl, or a cycloalkyl group such as cyclohexyl or any other hydrocarbon group.

The reaction is carried out simply by mixing the heavy metal compound, most preferably titanium tetrachloride, and the organo-aluminum compound, most preferably an aluminum trialkyl, in proportions such as to provide substantially equi-molecular amounts of heavy metal and aluminum, at any desired temperature, preferably at room temperature and, if desired, in the presence of an inert hydrocarbon diluent or solvent such as a saturated alkane, among which are cetane, hexane, heptane or the like or mixtures thereof such as "deobase" kerosene, or the mixture of alkanes resulting from the "Fischer-Tropsch" process, or a cycloalkane such as cyclohexane or methyl cyclohexane, or a benzene hydrocarbon such as benzene, toluene or xylene. It is important that the hydrocarbon solvent or diluent be free from oxygen and water, and that these materials be excluded from the reaction mixture during the reaction.

The reaction leading to the formation of the catalyst is generally rapid and exothermic and is accompanied by the development of color in the reaction mixture. For example, when one mole of titanium tetrachloride is introduced into a hexane solution of one mole of aluminum triethyl, in the absence of oxygen and water, the solution assumes a dark color with formation of a black difficultly soluble material of unknown structure but believed to be a compound of titanium in which the titanium exhibits a valance less than four. The resulting black material is a typical heavy metal catalyst for use in this invention. A similar material is produced when there is used, in place of aluminum triethyl, an aluminum trialkyl in which the alkyl groups contain 6 or more carbon atoms such as aluminum trioctyl, and this material is even more preferred since it has the advantage of being considerably more dispersible in the hexane diluent so that a black homogeneous colloidal solution of the heavy metal catalyst is secured.

In order to produce an all-cis 1,4 polyisoprene with the heavy metal catalysts disclosed herein, it is essential that the relative proportions of heavy metal compound and of organo-aluminum compound used to prepare the catalyst be rather closely controlled. It is most desirable to use one mole of trialkyl aluminum compound for each mole of heavy metal compound, preferably titanium tetrachloride, to give a ratio of heavy metal to aluminum of 1 to 1. However, it is possible to vary this ratio within limits of 0.5 to 1 to 1.5 to 1 since such proportions are also substantially equi-molecular. When working with titanium tetrachloride and dialkyl aluminum halides, the Ti/Al molar ratio is more preferably in the range of 0.5 to 1 to 1 to 1.

In the practice of this invention the polymerization of isoprene is carried out by bringing monomeric isoprene, preferably in highly purified condition, in contact with the heavy metal catalyst, preferably in presence of a hydrocarbon solvent (the solvent being any of those hydrocarbons disclosed hereinabove as solvents or diluents for use in connection with preparation of the catalyst) and preferably in the absence of other materials, particularly oxidizing materials such as oxygen and materials containing active hydrogen atoms such as water, acids, alcohols, etc. Neither the temperature nor the pressure at which the isoprene is brought into contact with the catalyst is critical, it being possible to use temperatures of room temperature or above or below and pressures of atmospheric or above or below atmospheric. Ordinarily it is preferred to introduce the monomeric isoprene in its normal liquid form into a colloidal solution or dispersion of the catalyst in hydrocarbon solvent, while maintaining an inert gas such as nitrogen over the solution or dispersion to avoid contact with air but without imposing any pressure other than that produced by the vapors of the materials present, and to maintain the colloidal solution or dispersion at a temperature of about 0 to 80° C., preferably about 20 to 50° C. Under these conditions the isoprene polymerizes, as evidenced by a gradual increase in viscosity of the reaction mixture, and by a moderate evolution of heat, in a period of about 30 minutes to 10 hours, generally 1 to 5 hours, to form a viscous homogeneous solution of the substantially all-cis 1,4 isoprene polymer in the hydrocarbon medium.

The relative amounts of hydrocarbon solvent, catalyst and isoprene monomer used in the polymerization process may be varied quite widely. It is desirable to use an amount of hydrocarbon solvent in excess of the amount of monomeric isoprene, for example, the use of 1 to 30, preferably 8 to 20 times as much hydrocarbon solvent as isoprene monomer by volume is suitable. The amount of catalyst is generally in the range of 0.5 to 20 percent by weight based on the weight of monomeric isoprene, the amount of catalyst being taken as the combined weight of the heavy metal compound and the organo-aluminum compound used in making the catalyst. As noted hereinabove the molar ratio of the two components used in making the catalyst is preferably at or near a ratio of 1:1.

After polymerization to form a viscous solution of all-cis, 1,4, head-to-tail polyisoprene rubber in hydrocarbon solvent, as described above, the rubber may be separated from the solvent and from catalyst residues by any of the conventional methods for yielding a solid rubber from a solution thereof. One preferred method consists in extracting the reaction solution several times with methyl alcohol or with methyl alcohol containing hydrochloric acid to remove catalyst residues and then to add a solvent such as acetone which is miscible with the hydrocarbon solvent but in which the rubber is insoluble to precipitate the rubber in finely-divided form. The rubber can then be washed on a wash mill, dried, and otherwise processed in the usual manner.

The synthetic polyisoprene rubber as formed by the polymerization consists substantially entirely of long chain molecules each having the orderly all-cis, 1,4, head-to-tail structure:

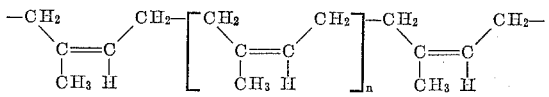

Since the rubber is formed in hydrocarbon solvent in the absence of oxygen, there is no opportunity for oxidation of molecules to occur until the rubber is isolated from the polymerization medium, but can then occur readily at the double bonds. In order to prevent this subsequent oxidation, it is desirable to add an antioxidant to the rubber while it is still in solution, this being conveniently done by including an antioxidant in the alcohol solution used to wash the rubber solution and free it from catalyst residues. There is thus secured after the washing step a hydrocarbon solution containing only hydrocarbon molecules (solvent molecules and polymer molecules) and antioxidant molecules. After precipitation of the rubber from the solution, the product is a solid unoxidized rubber hydrocarbon polymer protected against oxidation by antioxidant molecules but essentially free of other types of molecules.

Although the all-cis, 1,4, head-to-tail polyisoprene structure characteristic of the rubber of this invention is also characteristic of natural rubber such as is produced by the Hevea tree, it is to be pointed out that the two rubbers are not identical. Natural rubber, produced as it is by in vivo biological processes under oxidizing conditions occurring in the tree (which processes probably do not involve the polymerization of monomeric isoprene) contains components which are inherently not present in the rubber of this invention produced by the in vitro polymerization of monomeric isoprene under non-oxidizing conditions. For example, natural rubber latex as obtained from the tree is known to contain in addition to water and rubber hydrocarbon sizeable and varying amounts of "non-rubber" components including proteins, soaps, resins, sugars, etc. To purify the rubber portion is quite a difficult task since small but significant amounts of these materials remain, in the ordinary practices of separating natural rubber from latex, with the rubber portion. Moreover, their presence, and the presence of air during the processes for readying natural rubber for use as a solid rubber, make it likely that the chemical nature of the rubber molecule, as obtained even in purified form by special techniques, is not entirely hydrocarbon in nature, there being opportunity for oxidation reactions to occur to form

units or other oxygen-containing units. In contrast, the polyisoprene rubber of this invention in the form produced is made up of molecules so controlled in their previous environment as to consist only of hydrocarbon chains, the result being that the rubber of this invention is of a more uniform chemical nature than is natural rubber and is consequently superior to the natural material with respect to control of compounding and vulcanization.

The molecular weight and molecular weight distribution of the hydrocarbon chain molecules in the rubber of this invention is also more controllable than in the case of natural rubber. The process described herein is adaptable to give a linear polyisoprene rubber which is completely soluble in hydrocarbon solvents and is free of extremely high molecular fractions or cross-linked fractions, called gel, such as are present in natural rubber. Natural rubber must be milled to break chains and make it plastic for compounding but the rubber of this invention can be produced by the process herein described so as to be quite plastic without previous extensive breakdown. In general, the molecular weight of the individual molecules of the all-cis, 1,4 polyisoprene of this invention can range from 10,000 or even lower to 1,500,000 or even higher, but the molecular weights produced by the preferred polymerization process are in the order of 50,000 to 500,000 with average molecular weights of 50,000 to 150,000.

In structure and properties the polyisoprene of this invention is remarkably different from any heretofore known polymers produced by polymerization of monomeric isoprene. As regards structure, the work of Richardson and Sacher reported in Rubber Chemistry and Technology, vol. XXVII, No. 2, pages 348 to 362, shows that all polyisoprenes produced by known polymerization methods contain at least 5 percent of 1,2 addition and an appreciable percentage of 3,4 addition and that the 1,4 addition is not over about 40 percent of the cis type. The polyisoprene of this invention contains substantially no 1,2 or 3,4 addition and substantially no trans 1,4 addition but is an all-cis 1,4 head-to-tail polyisoprene.

Differences in properties between the polyisoprene of this invention and known polyisoprenes are equally as pronounced. The polyisoprene rubber of this invention possesses excellent tackiness in the unvulcanized state, being at least the equal of natural rubber, whereas known polyisoprenes as well as other known diene polymers and copolymers are far less tacky than natural rubber. When compounded in "pure gum" recipes and vulcanized, the polyisoprene of this invention yields vulcanizates which are several times as strong and elastic as are similar vulcanizates of known synthetic diene polymers. Vulcanizates of the polyisoprene of this invention are also able to withstand repeated flexing with low hysteresis or heat rise and are entirely suitable for use in carcasses of heavy duty tires, where it has heretofore been necessary to use natural rubber. In short the polyisoprene of this invention has properties when both unvulcanized and vulcanized which are at least equivalent to those of natural rubber, and it differs from and is superior to the known synthetic rubbers in all the respects in which natural rubber differs from and is superior to known synthetic rubbers.

Since the polyisoprene of this invention has the same unit structure as the natural rubber hydrocarbon, but is not as complex a material as natural rubber, it may be treated, processed and compounded in the same general manner as natural rubber, but with more precision and control, and may be used for all the multifarious purposes for which natural rubber has been used.

The polyisoprene of this invention and the process for its preparation are further illustrated and described in the following examples, which are in no way limiting of the invention, and in which all parts unless otherwise indicated are by weight.

*Example 1*

There is added to 200 parts by volume of deaerated heptane, 4.03 parts (11 millimols) of tri-n-octyl aluminum and then 2.085 parts (11 millimols) of anhydrous titanium tetrachloride. On addition of the titanium chloride the solution becomes warm (it previously being at room temperature) and assumes a dark color, due to reaction between the tri-n-octyl aluminum and the titanium tetrachloride believed to result in titanium compounds of a valence less than 4. This catalyst solution is aged for 30 minutes at room temperature and then diluted to contain a total of 1000 parts by volume of the deaerated heptane.

While maintaining the diluted catalyst solution so prepared under an atmosphere of nitrogen and in a state of constant agitation (produced by stirring) there is added to the catalyst solution 68 parts (104 parts by volume) of liquid monomeric isoprene which has been carefully distilled and dried to remove impurities and water. The rate of addition is such that about 45 minutes are required to add all the isoprene to the catalyst solution and the temperature of the solution is maintained in the range of 45 to 50° C. by heating. The vapors of isoprene and solvent above the solution are condensed and returned to the reaction mixture, but otherwise no attempt is made to carry out the addition of isoprene under pressure.

After addition of isoprene, stirring is continued and the temperature maintained at 45–50° C. until a total of about 2 hours have elapsed since starting the addition of isoprene. After one hour or less has elapsed it is noted that the heptane solution is becoming more viscous and that a lesser amount of heat is required to maintain the temperature, indicating that an exothermic polymerization is occurring. Viscosity continues to increase throughout the two hour interval, by the end of which the reaction mixture resembles a solution of natural rubber in hexane, aside from its dark color.

The reaction mixture is then extracted twice with 1000 parts by volume of methanol acidified with hydrochloric acid, which removes the color leaving a clear solution of the product in heptane, which is mixed with a sufficient quantity of acetone containing 0.7 part of phenyl beta naphthylamine (an antioxidant) to precipitate the rubber polymer from the heptane in crumb-like form. The crumb-like rubber polymer containing antioxidant and wet with acetone is then washed free from acetone and dried. There is obtained 55 parts (81%) of a rubbery polyisoprene, which on examination is found to possess a tackiness equivalent to that of milled natural rubber and far superior to that exhibited by conventional synthetic diene polymers.

When the polyisoprene so produced is examined with the infrared spectrophotometer in the manner described by Richardson and Sacher, Rubber Chemistry and Technology, vol. XXVII, No. 2, pages 348–362, it is found to possess an infrared spectrum substantially identical with the spectrum of the rubber hydrocarbon from the Hevea tree. The bands of the spectrum establish the fact that the polyisoprene produced contains all its isoprene units arranged in the cis, 1,4 head-to-tail manner, with substantially no isoprene units resulting from 2,3 addition, 3,4 addition or trans 1,4 addition.

The X-ray diffraction pattern of the polyisoprene of this example is also substantially identical with that of the rubber hydrocarbon from the Hevea tree, showing the same crystalline structure at 800 percent stretch. On analysis for carbon and hydrogen it is found actually to contain the theoretical calculated amount for $(C_5H_8)_n$.

Physical test data establish the remarkable superiority of the polyisoprene rubber of this example over other types of synthetic rubbers, and its adaptability for use in applications where synthetic rubbers have proved unsuitable and natural rubber heretofore has had to be used. To illustrate, the polyisoprene of this example is compounded in the usual manner in the following "pure gum" recipe:

| | Parts |
|---|---|
| Polyisoprene rubber of this example (containing about 1% phenyl beta naphthylamine antioxidant) | 100.00 |
| Zinc oxide | 5.00 |
| Stearic acid | 4.00 |
| Mercaptobenzothiazole (vulcanization accelerator) | 0.75 |
| Sulfur | 3.00 |

The compound is then vulcanized by heating for 40 minutes at 280° C. and the resulting strong "snappy" vulcanizate tested: (1) for tensile strength, ultimate elongation and 300% modulus by the standard procedure, at normal temperature and at the elevated temperature of 212° F., (2) for Durometer A hardness, (3) for low temperature properties by the Gehman Torsion Test, ASTM Designation D-1053-52T, ASTM Standards on Rubber Products, 1952, 547-53, (4) for resilience, hysteresis and dynamic modulus by the free vibration method using the Yerzley Oscillograph, ASTM Designation D-945-52T ASTM Standards on Rubber Products, 1952, 492-501, and (5) for hysteresis loss by a forced non-resonance vibration method using the Goodrich Flexometer, Lessig, Ind. Eng. Chem. Anal. Ed. 9, 582-8 (1937).

It is found by test (1) that the vulcanizate possesses a pure gum tensile of 1500 lbs./sq. in., an ultimate elongation of 725 percent and a 300 percent modulus of 280 lbs./sq. in. By contrast "pure gum" vulcanizates of known synthetic diene rubbers, GR–S for example, possess optimum tensile strengths of no more than 200–300 lbs./sq. in. and a much lower ultimate elongation. With suitable adjustment of vulcanization recipe and state of vulcanization it is possible with the polyisoprene rubber of this example to attain "pure gum" tensile strengths as high as 2000 to 5000 lbs./sq. in. and ultimate elongations as high as 900 percent, known to be attainable with natural rubber, whereas prior synthetic diene rubbers do not give desirable pure gum properties regardless of state of cure or recipe. It is also found that the polyisoprene of this example retains a large proportion of its tensile and elongation at 212° F., whereas known synthetic diene rubbers such as GR–S suffer a serious drop in these properties at this elevated temperature.

The Durometer A hardness of the polyisoprene vulcanizate is found in test (2) above to be 30, and to be capable of variation with vulcanization recipe and conditions so as to compare to that of rubber (about 40 in the same pure gum recipe).

In the Gehman Torsion Test, test (3) above, the data obtained, together with similar data for a typical natural rubber pure gum vulcanizate, and a standard GR–S vulcanizate of optimum properties (containing carbon black reinforcement), are shown below:

| | Polyisoprene of this Example, °C. | Natural Rubber, °C. | GR–S, °C. |
|---|---|---|---|
| $T_2$ | −47 | −49 | −36 |
| $T_5$ | −51 | −52 | −39 |
| $T_{10}$ | −53 | −54 | −41 |
| $T_{100}$ | −57 | −57 | −44 |
| Freeze Point | −57 | −57 | −44 |

The following data result from tests (4) and (5) above and are compared with similar data for a natural rubber vulcanizate and a GR–S vulcanizate of optimum properties:

| | Polyisoprene of this Example | Natural Rubber | GR–S |
|---|---|---|---|
| Test (2)—Yerzley: | | | |
| Percent Resilience $R_2/R_1$ | 95.3 | 95.4 | 84.7 |
| Static Modulus 20% | 280 | 420 | 520 |
| Dynamic Modulus | 351 | 490 | 730 |
| Test (3)—Goodrich Flexometer at 202° F.: | | | |
| ΔT (°F.) | 7 | 13 | 31 |
| Permanent Set (percent) | 2.3 | 5.9 | 9.4 |

These data show that the hysteresis properties of the polyisoprene vulcanizate of this example are at least equivalent to those of natural rubber, and far superior to those of GR–S.

In short, the test data of this example demonstrate that the polyisoprene of this invention gives vulcanizates which are far superior to conventional synthetic rubbers in those properties in which the conventional synthetic rubbers are deficient. The data further demonstrate that vulcanizates of the polyisoprene of this invention, while generally equivalent to natural rubber vulcanizates, are capable of greater adaptability than in the case of natural rubber. For example, the illustrated pure gum vulcanizate from the polyisoprene of this invention possesses superior hysteresis properties to natural rubber, although a lower tensile strength.

Examples 2 and 3

The procedure set forth in the first four paragraphs of Example 1 is twice repeated using in place of the amounts of tri-n-octyl aluminum and titanium tetrachloride reacted in the first paragraph the following amounts:

| Example | Al(n-octyl)$_3$ | TiCl$_4$, Parts | Ratios Ti/Al |
|---|---|---|---|
| 2 | 6.045 (16.5 millimols) | 2.085 (11 millimols) | 1/1.5 |
| 3 | 2.69 (6.28 millimols) | 2.085 (11 millimols) | 1.5/1 |

In each case a polyisoprene equivalent to that of Example 1 is obtained, but the yields are lower, the yield of polyisoprene being as follows:

| Example— | Percent yield |
|---|---|
| 2 | 30 |
| 3 | 33 |

Accordingly these examples illustrate the preference for a 1/1 Ti/Al molar ratio in the catalyst from trialkyl aluminum and titanium tetrachloride.

Example 4

The procedure of Example 1 is repeated except that the polymerization temperature is maintained at 20° C. instead of 50° C. The resulting polyisoprene has the same structure as that of Example 1 but of a considerably higher molecular weight.

Examples 5 to 15

In these examples, polyisoprene is produced using various heavy metal catalysts to replace the catalyst formed from tri-n-octyl aluminum and titanium tetrachloride, as illustrated in the first paragraph of Example 1. Otherwise the procedure is the same as Example 1. A 1/1 molar ratio of heavy metal compound to organo-aluminum compound is used. The following table shows the heavy metal compound and the organo-aluminum compound:

| Example | Heavy Metal Compound | Organo-Aluminum Compound |
|---|---|---|
| 5 | TiCl$_4$ | Diethyl aluminum chloride. |
| 6 | ZrCl$_4$ | Dimethyl aluminum methoxide. |
| 7 | CrCl$_3$ | Diethyl aluminum hydride. |
| 8 | WCl$_6$ | Diphenyl aluminum chloride. |
| 9 | Th acetylacetonate | Triethyl aluminum. |
| 10 | VCl$_4$ | Do. |
| 11 | Cr acetylacetonate | Do. |
| 12 | TiCl$_4$ | Triisobutyl aluminum. |
| 13 | Zr acetylacetonate | Triethyl aluminum. |
| 14 | V acetylacetonate | Tri-n-propyl aluminum. |
| 15 | ZrI$_4$ | Tri-n-octyl aluminum. |

Examples 16 to 20

The procedure of Example 1 is again repeated using various solvents in place of heptane. The solvents used are as follows:

| Example | Solvent |
|---|---|
| 16 | Deobase (distilled from 0.3% solution of diisobutyl aluminum hydride). |
| 17 | n-Butane (distilled from 0.5% solution of methyl aluminum iodide.) |
| 18 | Cyclohexane (distilled from triisobutyl aluminum). |
| 19 | Methyl cyclopentane (distilled from triisobutyl aluminum). |
| 20 | Benzene (distilled from triisobutyl aluminum). |

In each case the results are equivalent to those of Example 1.

It will be understood that modifications and variations from the procedure described in detail herein may be made in accordance with the usual knowledge of the man skilled in the art without departing from the invention. For example, the phenyl beta naphthylamine antioxidant used in the examples may be replaced by any of the host of known rubber antioxidants including any of the well-known aromatic amine antioxidants such as alkylated diphenyl amines (for example. "Agerite Stalite") diphenyl amine acetone condensation products (for example "BLE"), and any of the well-known phenolic antioxidants such as alkylated phenols and bis-phenols, etc. Still other modifications and variations will occur to those skilled in the art and are, unless otherwise indicated, within the spirit and scope of the invention as defined in the appended claims.

A related invention involving the use of aluminum titanium catalysts in the polymerization of aliphatic conjugated polyolefins is described and claimed in the copending application of Earl J. Carlson and Samuel E. Horne, Jr., Serial No. 503,027, filed April 21, 1955.

I claim:

1. The method of producing substantially cis-1,4 solid polyisoprene which comprises the steps of adding to monomeric isoprene a liquid hydrocarbon solvent containing a catalyst consisting essentially of the composition produced by adding to said solvent (a) a titanium tetrahalide and (b) a trialkyl aluminum wherein each alkyl group contains from 2 to 8 carbon atoms, in proportions of (a) and (b) such as to provide in said catalyst a molar ratio of titanium to aluminum of 0.5 to 1 to 1.5 to 1.

2. The method of producing solid polyisoprene which comprises the steps of adding to monomeric isoprene a liquid hydrocarbon solvent containing a catalyst consisting essentially of the composition produced by adding to said solvent (a) titanium tetrachloride and (b) a trialkyl aluminum wherein each alkyl group contains from 2 to 8 carbon atoms, in proportions of (a) and (b) such as to provide in said catalyst a molar ratio of titanium to aluminum of .5 to 1 to 1.5 to 1.

3. The method of producing from monomeric isoprene a cis-1,4 polyisoprene rubber substantially equivalent to the natural rubber hydrocarbon from the Hevea tree, which method comprises polymerizing liquid monomeric isoprene under conditions of temperature and pressure such that monomeric isoprene is maintained in the liquid phase, and under conditions of agitation, in the presence in said liquid phase of 0.5 to 20 percent by weight based on said monomeric isoprene of a catalyst of the composition produced by combining under said conditions (a) titanium tetrachloride and (b) an organo aluminum compound of the formula

wherein R' is a hydrocarbon radical of 1 to about 8 carbon atoms, R" is selected from the class consisting of hydrocarbon radicals of 1 to about 8 carbon atoms and hydrogen and R'" is selected from the class consisting of hydrocarbon radicals of 1 to about 8 carbon atoms, oxyhydrocarbon radicals of 1 to about 8 carbon atoms, hydrogen and halogen, in proportions of (a) and (b) such as to provide in said catalyst a molar ratio of titanium to aluminum of about 0.5 to 1 to 1.5 to 1.

4. The method of producing from monomeric isoprene a cis-1,4 polyisoprene rubber essentially indistinguishable in terms of cis-1,4 structure from the natural rubber hydrocarbon from the Hevea tree and in which essentially all the isoprene units are arranged in cis-1,4 structure, which method comprises the steps of (1) mixing monomeric isoprene with an excess ranging from 1 to 30 times the volume of said monomeric isoprene of a liquid hydrocarbon solvent selected from the class consisting of alkanes, cycloalkanes, and benzene hydrocarbons, said solvent containing a catalyst of the composition produced by adding to said solvent of (a) titanium tetrachloride and (b) a trialkyl aluminum in which each alkyl group contains from 1 to about 8 carbon atoms in proportions of (a) and (b) such as to provide in said catalyst a molar ratio of titanium to aluminum of about 0.5 to 1 to 1.5 to 1, (2) agitating the resulting mixture under autogenous pressure at a temperature of about 0 to 80° C. for a time sufficient to permit said monomeric isoprene to polymerize, and (3) separating from said mixture said cis-1,4 polyisoprene rubber.

5. The method of claim 4 wherein (b) is triisobutyl aluminum.

6. The method of claim 4 wherein (b) is triethyl aluminum.

7. The method of claim 4 wherein (b) is trioctyl aluminum.

8. The method of claim 4 wherein the molar ratio of titanium to aluminum is about 1 to 1.

References Cited in the file of this patent

UNITED STATES PATENTS

| | | |
|---|---|---|
| 1,058,056 | Harries | Apr. 8, 1913 |
| 2,440,498 | Young et al. | Apr. 27, 1948 |
| 2,506,857 | Crouch | May 9, 1950 |
| 2,559,062 | Dornte | July 3, 1951 |
| 2,699,457 | Ziegler et al. | Jan. 11, 1955 |
| 2,721,189 | Anderson et al. | Oct. 18, 1955 |
| 2,862,917 | Anderson | Dec. 2, 1958 |
| 2,905,645 | Anderson | Sept. 22, 1959 |

FOREIGN PATENTS

| | | |
|---|---|---|
| 12,980 | Great Britain | Dec. 1, 1913 |

OTHER REFERENCES

Journal of Polymer Science, volume 2, 1947, page 252.